United States Patent [19]

Hasegawa et al.

[11] Patent Number: 5,329,216
[45] Date of Patent: Jul. 12, 1994

[54] MULTI-SHAFT DRIVING APPARATUS AND FLUID ROTARY APPARATUS

[75] Inventors: Mikio Hasegawa, Neyagawa; Teruo Maruyama, Hirakata, both of Japan

[73] Assignee: Matsushita Electric Industrial Co., Ltd., Osaka, Japan

[21] Appl. No.: 70,038

[22] Filed: Jun. 1, 1993

Related U.S. Application Data

[63] Continuation of Ser. No. 843,849, Feb. 28, 1992, abandoned.

[30] Foreign Application Priority Data

Mar. 4, 1991 [JP] Japan ................. 3-037223

[51] Int. Cl.⁵ .................... H02P 1/56; F04B 41/06
[52] U.S. Cl. ....................... 318/654; 318/625; 318/101; 417/5
[58] Field of Search ............... 318/34, 41, 45, 53, 318/59, 66, 68, 69, 70, 101, 430, 431, 625, 654, 595, 608, 615, 618, 683; 417/2, 3, 4, 5, 17, 312, 410, 420, 426

[56] References Cited

U.S. PATENT DOCUMENTS

| | | | |
|---|---|---|---|
| 4,048,657 | 9/1977 | Knuth | 358/285 |
| 4,625,156 | 11/1986 | Komiya et al. | 318/85 |
| 4,829,217 | 5/1989 | Kameyama et al. | 318/51 |
| 5,037,252 | 8/1991 | Hasegawa et al. | 318/625 X |
| 5,115,172 | 5/1992 | Ishii et al. | 318/38 |

FOREIGN PATENT DOCUMENTS

0221003A3 5/1987 European Pat. Off. .
0382029A1 8/1990 European Pat. Off. .
2163474 6/1973 Fed. Rep. of Germany .
3230550 1/1984 Fed. Rep. of Germany .

*Primary Examiner*—Bentsu Ro
*Attorney, Agent, or Firm*—Wenderoth, Lind & Ponack

[57] ABSTRACT

A multi-shaft driving apparatus includes a plurality of motors each for rotating one of a plurality of shafts to be synchronously rotated, an encoder, provided for each motor, for detecting a rotational state of the shafts, a pulse generator for generating a pulse signal for rotating the shafts, and a motor control circuit, provided for each motor, for inputting the pulse signal generated by the pulse generator for rotating the shafts and a pulse signal detected by the encoder and used as a feedback signal. The motor control circuit has a PLL control section and a rotational angle phasing section so that a rotational angle phasing control loop is generated to perform a rotational angle phasing operation by the rotational angle phasing section so to as place the shafts in position at a driving start and after performing the rotational angle phasing operation, a rising and steady control loop is generated to perform an operation from a rise state to a steady state by the PLL control section. A fluid rotary apparatus includes a plurality of rotors accommodated in a housing, a plurality of shafts each for rotating one of the rotors to be synchronously rotated, and a fluid drawing opening formed in the housing and a fluid discharge opening formed therein, in addition to the structure of the multi-shaft driving apparatus so that the volume change of a space formed by the rotors or by the rotors and the housing is utilized to draw and discharge fluid.

3 Claims, 4 Drawing Sheets

MULTI-SHAFT DRIVING APPARATUS AND FLUID ROTARY APPARATUS

This application is a continuation of now abandoned application Ser. No. 07/843,849, filed on Feb. 28, 1992, now abandoned.

BACKGROUND OF THE INVENTION

The present invention relates to a multi-shaft driving apparatus and a fluid rotary apparatus.

Conventionally, equipment is provided with multi-shaft driving apparatus for driving a plurality of shafts synchronously by a plurality of motors.

In order for the multi-shaft driving apparatus to rotate a plurality of shafts synchronously with a high accuracy, it is proposed that an encoder, a pulse generator, and a motor control circuit are provided for each motor. The encoder detects the rotational state of each. The pulse generator generates pulse signals for rotating the shafts. The motor control circuit, having a PLL control section, inputs the pulse signals outputted from the pulse generator and pulse signals fed back by the encoder as a result of the detection of the rotational states of each shaft. In the above construction, a PLL control loop which passes through the PLL control section is formed.

According to the above multi-shaft driving apparatus, the shafts are driven synchronously in a steady state by the PLL control section, but they do not rotate synchronously during transient states such as rise time and fall time in the rotations of the shafts because PLL control is not performed during such transient states.

Vacuum technology is used in a very wide range from a technological field closely relating to daily life to a high technological field. Thus, vacuum technology is indispensable for technological progress.

Recently, an oil-free dry pump which forms a clean vacuum has become noteworthy in view of the progress of semiconductor industry.

The dry pumps now used includes screw type, scroll type, and claw type pumps. A positive-displacement vacuum pump is normally used in a low vacuum degree ranging from atmospheric pressure to $10^{-2}$–$10^{-3}$ torr. The positive-displacement vacuum pump comprises a plurality of rotors accommodated in a housing; a plurality of driving shafts which rotate the rotors synchronously; and a fluid suction opening and a fluid discharge opening formed in the housing. Utilizing the volume change of a space formed by the rotors or by the housing and the rotors, the drive pump draws and discharges fluid.

In order to make the pump oil-free, the conventional pump comprises a timing gear for rotating a motor shaft for driving synchronously a plurality of rotors; an oil chamber provided in a space accommodating a bearing; and a mechanical seal provided between the oil chamber and a space (suction chamber) formed by the rotors and the housing so as to prevent oil from penetrating into the space.

However, according to the conventional pump of the above construction, it is necessary to periodically replace oil and the mechanical seals and in addition, it is difficult to prevent the leakage of oil from the oil chamber.

The inventors of the present invention have already proposed a fluid rotary apparatus (oil-free vacuum pump) comprising two rotors synchronously rotated without contacting each other by the above-described multi-shaft synchronous control. However, the proposal does not describe the method for synchronously rotating the rotors during the starting and stopping of the vacuum pump.

SUMMARY OF THE INVENTION

Accordingly, an essential object of the present invention is to provide a multi-shaft driving apparatus capable of synchronously rotating shafts with a high accuracy even during transient states and provide a fluid rotary apparatus capable of rotating a plurality of rotors synchronously without the rotors contacting each other in the starting, steady state, and stopping of the apparatus.

In accomplishing these and other objects, according to one aspect of the present invention, there is provided a multi-shaft driving apparatus comprising:

a plurality of motors each for rotating one of a plurality of shafts to be synchronously rotated;

an encoder, provided for each motor, for detecting a rotational state of the shafts;

a pulse generator for generating a pulse signal for rotating the shafts; and a motor control circuit, provided for each motor, for inputting the pulse signal from the pulse generator and a pulse signal detected by the encoder and used as a feedback signal to control the synchronization of the shafts, the motor control circuit having a PLL control section and a rotational angle phasing section so that a rotational angle phasing control loop is generated to perform a rotational angle phasing operation by the rotational angle phasing section so as to place the shafts in position at a driving start and after performing the rotational angle phasing operation, wherein a rising and steady control loop is generated to perform an operation from a rise state to a steady state by the PLL control section.

According to the above construction, the shafts can be rotated synchronously not only in the steady state, but also in the transient state. Thus, the apparatus can be utilized in a wide range.

According to another aspect of the present invention, in a fluid rotary apparatus comprising:

a plurality of rotors accommodated in a housing;

a plurality of shafts each for rotating one of the rotors to be synchronously rotated; and a fluid drawing opening formed in the housing and a fluid discharge opening formed therein;

wherein the volume change of a space formed by the rotors or by the rotors and the housing is utilized to draw and discharge fluid, the improvement comprising:

a plurality of motors each for rotating one of a plurality of the shafts to be synchronously rotated;

an encoder, provided for each motor, for detecting the rotational state of the shafts;

a pulse generator for generating a pulse signal for rotating the shafts; and a motor control circuit, provided for each motor, for inputting the pulse signals from the pulse generator and a pulse signal detected by the encoder and used as a feedback signal to control the synchronization of the shafts, the motor control circuit having a PLL control section and a rotational angle phasing section so that a rotational angle phasing control loop is generated to perform a rotational angle phasing operation by the rotational angle phasing section so as to place the shafts in position at a driving start and after performing the rotational angle phasing operation, wherein a rising and steady control loop is generated to perform an operation from a rise state to a steady state by the PLL control section.

According to the above-described construction, the fluid rotary apparatus may be applied to a positive-displacement vacuum pump. The pump does not require the provision of a mechanical sliding portion which allows the shafts to be rotated synchronously both in the transient state (rise time and fall time) and in the steady state. That is, the pump does not require a supply of lubricating oil. Therefore, the pump is clean and the shafts rotate at a high speed, and in addition, the apparatus is durable.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

An embodiment as defined in claim 1 of the present invention will be described below with reference to FIGS. 1 and 4.

Figure 1:
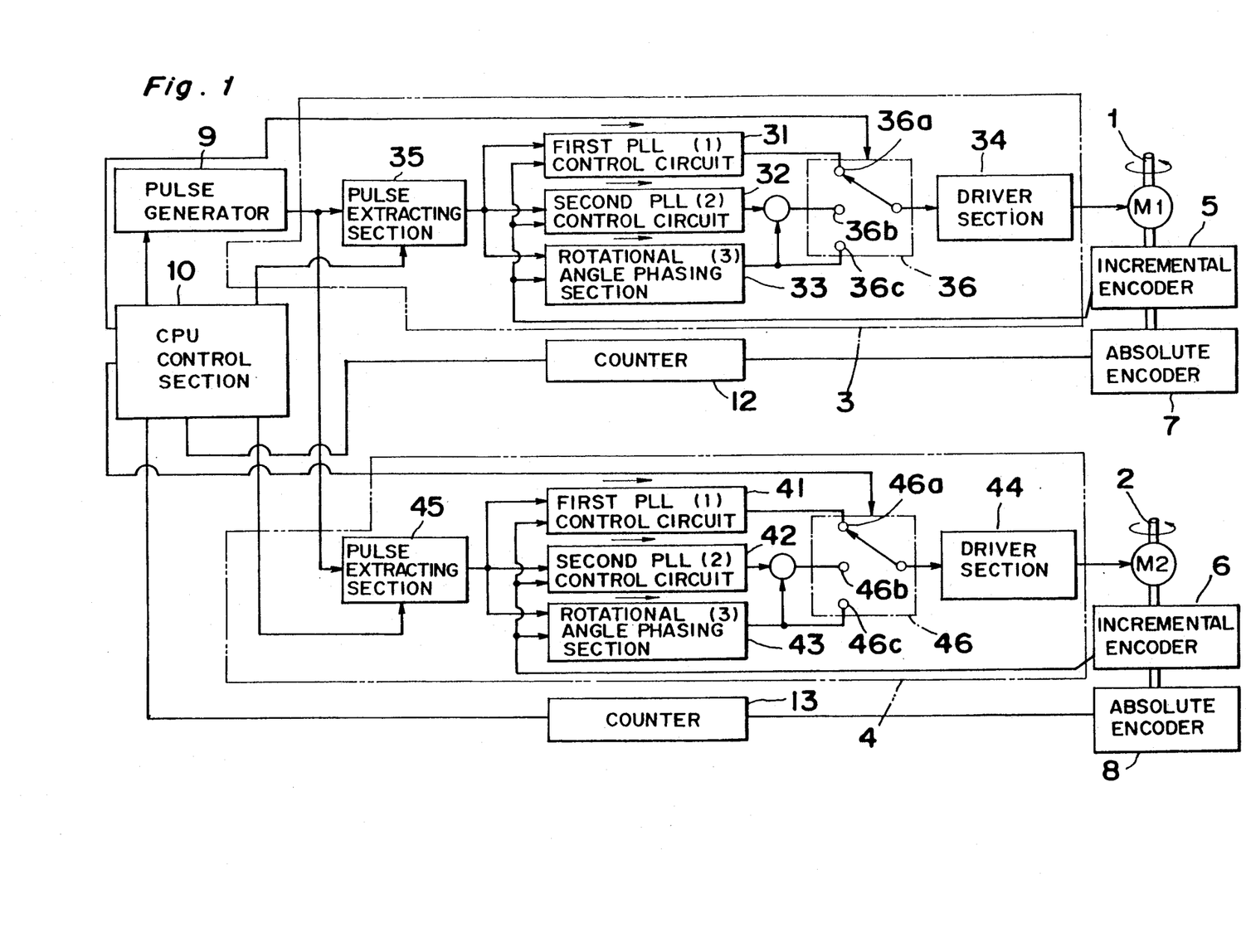
FIG. 1 is a block diagram showing a multi-shaft driving apparatus according to an embodiment of the present invention.

FIG. 1 is a block diagram showing the construction of a multi-shaft driving apparatus according to the embodiment.

The apparatus comprises motors M1 and M2 each for driving shafts 1 and 2 to be synchronously rotated; motor control circuits 3 and 4 for controlling the motors M1 and M2, respectively; incremental encoders 5 and 6 and absolute encoders 7 and 8, for detecting the rotational state of the shafts 1 and 2, namely, the rotational position thereof and the rotational speed thereof; a pulse generator 9, having a pulse output which is input to the motor control circuits 3 and 4, for generating pulse signals for rotating the shafts 1 and 2; and a CPU control circuit 10 for outputting control signals to the motor control circuits 3 and 4 and to the pulse generator 9.

The motor control circuits 3 comprises a first PLL control circuit 31; a second PLL control circuit 32; a rotational angle phasing circuit 33; a driver section 34 consisting of a current amplifier; and a pulse extracting section 35. The motor control circuits 4 comprises a first PLL control circuit 41; a second PLL control circuit 42; a rotational angle phasing circuit 43; a driver section 44 consisting of a current amplifier; and a pulse extracting section 45. The "PLL control" means a phase-locked loop control. Pulse signals, generated by the pulse generator 9, for rotating the shafts 1 and 2 and pulse signals detected by the incremental encoders 5 and 6 serving as feedback signals are inputted to the first and second PLL control circuits 31, 32, 41, and 42 and the rotational angle phasing sections 33 and 43 via the pulse extracting sections 35 and 45. The following three control loops (1), (2), and (3) are generated. The first PLL control loop (1) passes through the first PLL control circuits 31 and 41. The second PLL control loop (2) passes through the second PLL control circuits 32 and 42. The rotational angle phasing control loop (3) passes through the rotational angle phasing sections 33 and 43. Upon receipt of the output of the CPU control section 10, contacts of switching sections 36 and 46 are changed as follows to select a first state, a second state or a third state. When contacts 36a and 46a are connected to the CPU control section 10, the first state in which only the first PLL control loop (1) is generated is selected. When contacts 36b and 46b are connected therewith, the second state in which the second PLL control loop (2) and the rotational angle phasing control loop (3) are generated is selected. When contacts 36c and 46c are connected therewith, the third state in which only the rotational angle phasing control loop (3) is generated is selected.

The PLL control circuits 31, 32, 41, and 42 detect the phase difference between the pulse signal, for rotating the shafts 1 and 2, outputted from the pulse generator 9 and the pulse signal detected by the incremental encoders 5 and 6 so that the frequency of both signals and the phase thereof are coincident with each other. The signal indicating the detected phase difference is used as a feedback control. For example, both pulse signals are inputted to the PLL control circuits 31, 32, 41, and 42 and a phase compensation is made by detecting the phase difference between both pulse signals by a phase comparator and by passing a signal indicating the phase difference through a low-pass filter. Since this method is known, a description thereof has been omitted.

Upon receipt of an instruction of the CPU control section 10, the pulse extracting sections 35 and 45 extract the instructed number of pulses from pulse signals, for rotating the shafts 1 and 2, outputted from the pulse generator 9.

The signal outputted from the absolute encoders 7 and 8 are converted into a signal indicating the rotational position of the shafts 1 and 2 by counters 12 and 13, and then the converted signal is inputted to the CPU control section 10.

The operation of the apparatus of the above construction is described below.

Rise Time 1

Figure 4:
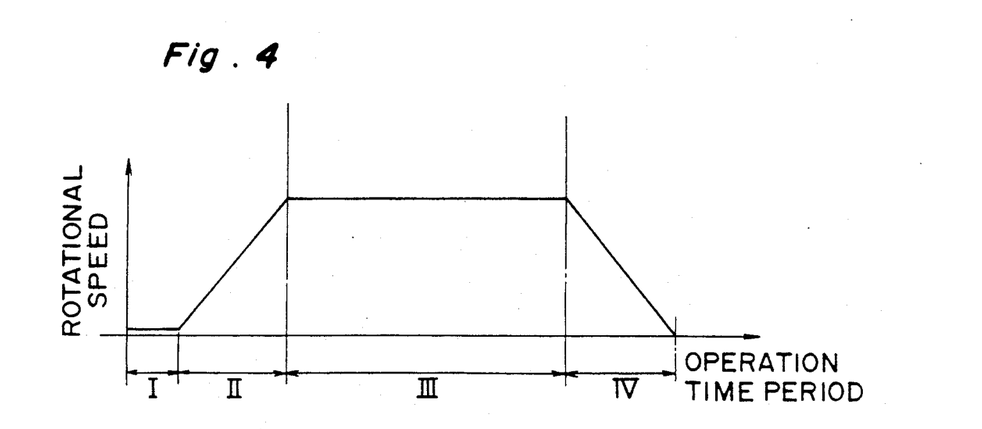
FIG. 4 is a graph showing the number of rotations of shafts of the multi-shaft driving apparatus of FIG. 1 with respect to the passage of drive time of the multi-shaft driving apparatus.

Period of (I) of FIG. 4

First, the phase difference between the rotational angle of the shafts 1 and 2 is adjusted to a predetermined phase difference.

In the motor control circuits 3 and 4, the state in which only the rotational angle phasing control loop (3) is generated is selected, i.e., the contacts 36c and 46c are selected. The CPU control section 10 issues to the pulse generator 9 an instruction for generating pulse signals, for rotating the shafts 1 and 2, at a low frequency. In addition, based on the signal indicating the rotational position detected by the absolute encoders 7 and 8, the CPU control section 10 controls the pulse extracting sections 35 and 45 so that the pulse generator 9 outputs a necessary number of pulses to the motor control circuits 3 and 4. Thus, the phase difference between the rotational angle of the shafts 1 and 2 is adjusted to a predetermined phase difference.

Rise Time 2

Period of (II) of FIG. 4

The rotational speed of the shafts 1 and 2 is increased to that of the steady state with the phase difference between the rotational angle of the shafts 1 and 2 kept at a predetermined phase difference.

In the motor control circuits 3 and 4, the state in which the second PLL control loop (2) and the rotational angle phasing control loop (3) are generated in parallel is selected, i.e., the contacts 36b and 46b are selected. The frequency of the pulse signal, for rotating the shafts 1 and 2, outputted from the pulse generator 9 is gradually increased. The second PLL control loop (2) does not have a fast response to a great fluctuation of the frequency of the pulse signal and consequently, the second PLL control loop (2) alone is incapable of keeping the initially set phase difference between the rotational angle of the shafts 1 and 2. The rotational angle phasing control loop (3) has the following function. That is, the rotational angle phasing sections 33 and 43 having a deviation counter, respectively monitor the output of the incremental encoders 5 and 6 and instantly correct the deviation of the phase difference between the rotational angle of the shafts 1 and 2, thus accurately following the rise of the frequency of the pulse signal. That is, the rotational angle phasing control loop (3) performs the speed control of f/V conversion system. Thus, in cooperation of the second PLL control loop (2) and the rotational angle phasing control loop (3), the shafts 1 and 2 can be synchronously rotated with a high accuracy even in the transient state.

Steady Drive

Period of (III) of FIG. 4

When the number of rotations of the shafts 1 and 2 has become the number of the steady state, in the motor control circuits 3 and 4, the state in which only the first PLL control loop (1) is generated is selected, i.e., the contacts 36a and 46a are selected. In the steady state, the frequency of the pulse signal for rotating the shafts 1 and 2 is almost constant. Therefore, even though the rotational angle phasing control loop (3) does not function, the phase difference between the rotational angle of the shafts 1 and 2 is kept at the predetermined phase difference. Another reason the rotational angle phasing control loop (3) is not allowed to operate in the steady state is as follows: In the steady state, an optimum control may be made by slightly varying the predetermined phase difference between the rotational angle of the shafts 1 and 2. To this end, the pulse extracting sections 35 and 45 extract a necessary number of pulses from the pulse signal for rotating the shafts 1 and 2. But if the rotational angle phasing control loop (3) functions, the varied phase difference returns to the predetermined phase difference. That is, the predetermined phase difference cannot be varied.

Fall Time

Period of (IV) of FIG. 4

When the operation is to be stopped, the rotations of the shafts 1 and 2 are stopped with the phase difference between the rotational angle of the shafts 1 and 2 kept at the predetermined phase difference.

In the motor control circuits 3 and 4, the state in which the second PLL control loop (2) and the rotational angle phasing control loop (3) are generated in parallel is selected, i.e., the contacts 36b and 46b are selected. The frequency of the pulse signal for rotating the shafts 1 and 2 is gradually decreased. The second PLL control loop (2) has a fast response to a slight fluctuation of the frequency of the pulse signal, but does not have a fast response to a great fluctuation of the frequency thereof and consequently, the second PLL control loop (2) alone is incapable of keeping the predetermined phase difference between the rotational angle of the shafts 1 and 2 at the predetermined phase difference. The rotational angle phasing control loop (3) has the following function. That is, the rotational angle phasing sections 33 and 43 having a deviation counter, respectively monitor the output of the incremental encoders 5 and 6 and instantly correct the deviation of the phase difference between the rotational angle of the shafts 1 and 2, thus accurately following the fall of the frequency of the pulse signal. Thus, in cooperation of the second PLL control loop (2) and the rotational angle phasing control loop (3), the shafts 1 and 2 can be synchronously rotated with a high accuracy even in the fall time.

The CPU control section 10 monitors the signal, indicating the phase difference between the rotational angle of the shafts 1 and 2, detected by the absolute encoders 7 and 8 in the rise time and fall time of the shafts 1 and 2. If the CPU control section 10 detects a deviation in the phase difference between the rotational angle of the shafts 1 and 2, the CPU control section 10 controls the pulse extracting sections 35 and 45 so as to correct the frequency and phase of the pulse signal for rotating the shafts 1 and 2 and the deviated phase difference in the phase difference between the rotational angle of the shafts 1 and 2.

In the above embodiment, the motor control circuits 3 and 4 have two PLL control circuits 31 and 32, and two PLL control circuits 41 and 42, respectively, but the motor control circuits 3 and 4 may include one PLL control circuit 32 and 42, respectively so that the output of the PLL control circuits 32 and 42 is directly connected to the contact 36a and 46a, respectively.

The multi-shaft driving apparatus shown in FIG. 1 allows the shafts to be rotated synchronously not only in the steady state, but also in the transient state. Thus, the apparatus can be utilized in a wide range.

A fluid rotary apparatus to which the above embodiment is applied is described below with reference to FIGS. 2 and 3.

Figure 2:
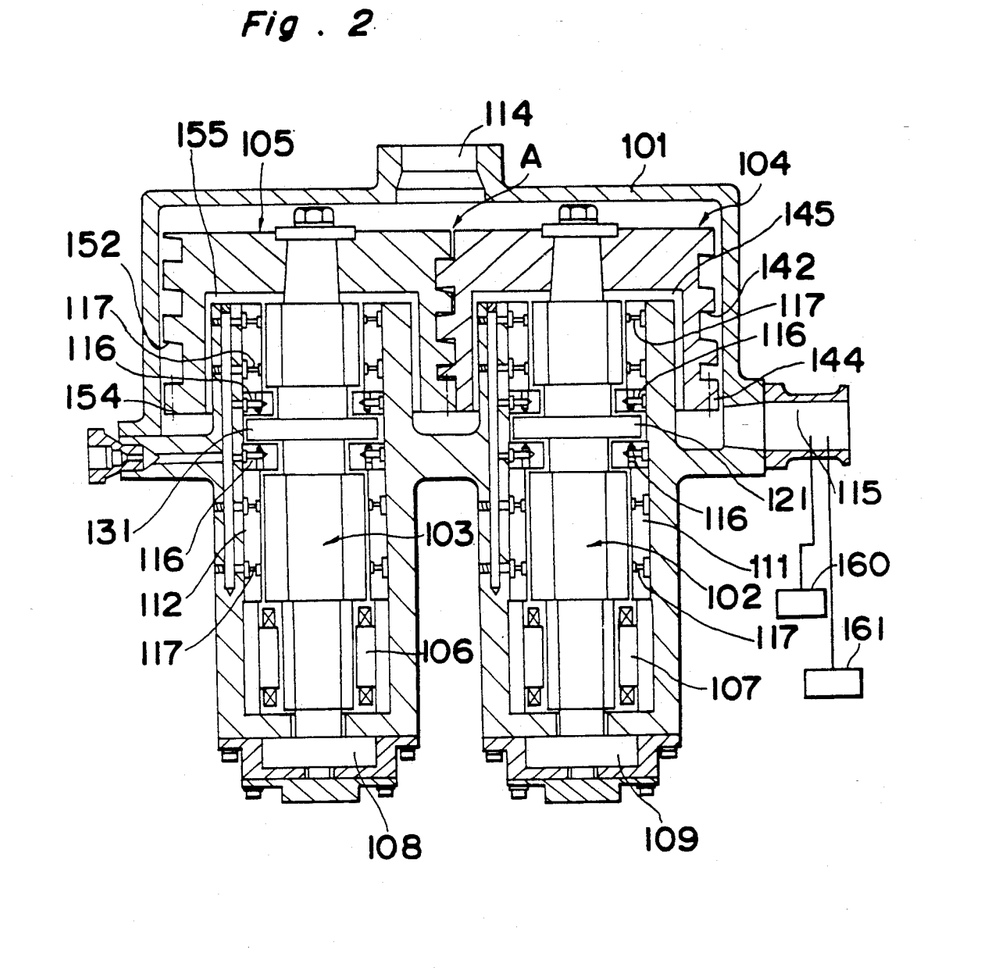
FIG. 2 is a sectional view showing a positive-displacement vacuum pump applied to a fluid rotary apparatus according to the present invention.
Figure 3:
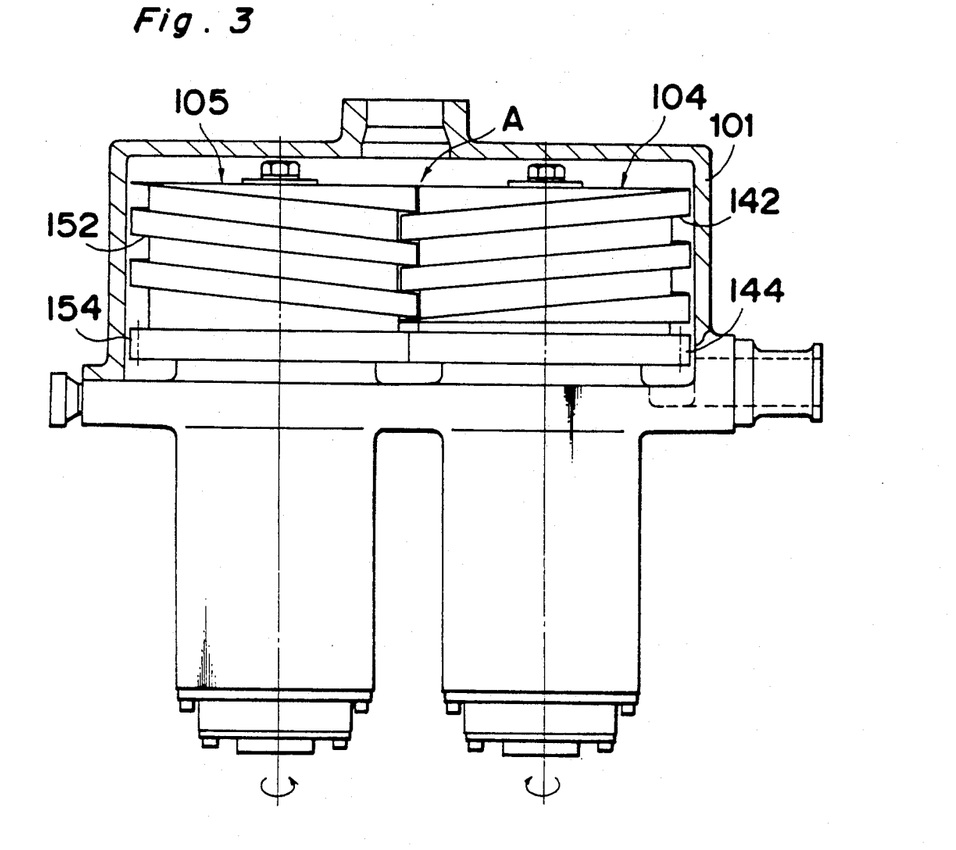
FIG. 3 is a front view, showing a positive-displacement vacuum pump applied to a fluid rotary apparatus, in which a housing is broken away.

FIGS. 2 and 3 show a positive-displacement vacuum pump according to an embodiment of the present invention. FIG. 2 is a sectional view of the pump. FIG. 3 is a front view, showing the positive-displacement vacuum pump, in which a housing is broken away.

The vacuum pump comprises a first bearing chamber 111 accommodating a first rotary shaft 102 vertically and a second bearing chamber 112 accommodating a second rotary shaft 103 vertically. Cylindrical rotors 104 and 105 are mounted on upper portions of the shafts 102 and 103, respectively. Screws 142 and 152 are formed on the peripheral surfaces of the rotors 104 and 105, respectively so that the screws 142 and 152 engage each other. The engagement portion of the screws 142 and 152 is denoted by (A). That is, a space formed by the concave (groove) and convex of the engagement portion (A) of the screws 142 and 152 and the housing 101 changes its volume cyclically with the rotation of the shafts 102 and 103. Thus, fluid sucking and discharging operations are performed.

As shown in FIGS. 2 and 3, gears 144 and 154 for preventing the contact of the screws 142 and 152 are formed on the peripheral surfaces of the rotors 104 and 105 at the lower end thereof. A solid lubricating film is formed on the gears 144 and 154 so that the metal of the gears 144 and 154 are capable of withstanding a small degree of contact. A gap (backlash) $\delta_2$ between the engagement portion of the gears 144 and 154 is set to be smaller than a gap (backlash) $\delta_1$ between the engagement portion (A) of the screws 142 and 152 formed on the peripheral surfaces of the rotors 104 and 105, respectively. The gears 144 and 154 do not contact each other when the shafts 102 and 103 are synchronously and smoothly rotating. If they are not rotating synchronously, the gears 144 and 154 contact each other, thus preventing the contact of the screws 142 and 152. The amount of backlashes $\delta_1$ and $\delta_2$ is too small to be accurately processed for practical use. The total amount of fluid leakage during one process of the pump is proportional to the period of time required in the process. Therefore, while the shafts 102 and 103 are rotating at a high speed, the performance of the pump such as the ultimate amount of vacuum can be sufficiently maintained even though the backlash $\delta_1$ is made to be comparatively large. Accordingly, the dimension of the backlashes $\delta_1$ and $\delta_2$ necessary for preventing the collision of the screws 142 and 152 can be reliably obtained by rotating the shafts 1 and 2 at a high speed even though the processing accuracy of the screws is not high.

A gas suction opening 114 and a gas discharge opening 115 are provided upstream and downstream of the engagement portion (A) of the housing 101, respectively.

The shafts 102 and 103 are supported by a non-contact type static pressure bearing, which is described below, provided in internal spaces 145 and 155 of the rotors 104 and 105. That is, a thrust bearing is constituted by supplying compressed gas from orifices 116 to the upper and lower surfaces of the disks 121 and 131 formed on the shafts 102 and 103, respectively, and a radial bearing is composed by supplying compressed gas from orifices 117 to the peripheral surface of the shafts 102 and 103. The utilization of clean nitrogen gas which is available in a semiconductor factory as a compressed gas is capable of making the pressure inside the internal spaces 145 and 155 accommodating a motor higher than the atmospheric pressure. Thus, reactive gas which is corrosive and easily produces sediment can be prevented from penetrating into the internal spaces 145 and 155.

Instead of the static pressure bearing, the bearing may be composed of a magnetic bearing which is also of a non-contact type and as such is oil-free. Therefore, the shafts 102 and 103 are capable of rotating at a high speed. If a ball bearing is used in the bearing portion (chamber) and lubricating oil is used to lubricate the ball bearing, a gas verge mechanism utilizing nitrogen gas is capable of preventing the penetration of lubricating oil into a fluid actuation chamber.

Both the shafts 102 and 103 are rotated at a speed as high as tens of thousands of rpm by AC servo motors 107 and 106 provided each in a lower portion of the shafts 102 and 103.

Encoders 108 and 109 are provided on the lower ends of the shafts 102 and 103 and correspond to the encoders 5,6,7, and 8 in FIG. 1.

The operation of the vacuum pump is described below.

First, in driving the vacuum pump, the phase difference between the rotational angles of the shafts 102 and 103 is adjusted to a predetermined phase difference under the control of the rotational angle phasing control loop (3) so that the center line of the convex or concave of the screw 142 and that of concave or convex of the screw 152 align with each other. The phase difference in the rotational angle between the shafts 1 and 2 can be adjusted to the predetermined phase difference by the gears 144 and 154.

Subsequently, the rotational speed of the shafts 102 and 103 is increased to that of the steady state with the phase difference in the rotational angle between the shafts 102 and 103 kept at the predetermined phase difference. The rotational speed of the shafts 102 and 103 smoothly rises to that of the steady state in an accurate accordance with the rotational speed instructed by the pulse signal, for rotating the shafts 102 and 103, outputted from the pulse generator 9 without the gears 144 and 154 (screws 142 and 152) contacting each other. This is the above-described rise time operation of the multi-shaft driving apparatus. Alternatively, the first part of the rise time operation can be performed by the rotation of the gears 144 and 154 (screws 142 and 152).

In the steady drive, the shafts 102 and 103 are rotated synchronously with a high accuracy by the first PLL control loop (1).

In stopping the vacuum pump, with the phase difference between the rotational angles of the shafts 102 and 103 kept at the predetermined phase difference, the rotation of the shafts 102 and 103 can be stopped in an accurate accordance with the rotational speed instructed by the pulse signal for rotating the shafts 102 and 103 without the contact of the gears 144 and 154 (screws 142 and 152). This is the above-described fall time operation of the multi-shaft driving apparatus.

As described above, the vacuum pump is capable of rotating the shafts 102 and 103 or the screws 142 and 152 synchronously with a high accuracy not only in the steady state, but also in the transient state.

That is, according the vacuum pump to which the present invention applies, the shafts 102 and 103 are not rotated synchronously by a timing gear. Therefore, it is unnecessary to use lubricating oil or an oil seal in the timing gear. Consequently, a clean vacuum without oil can be obtained. Since a mechanical sliding portion is not provided, the shafts 102 and 103 can be rotated at a high speed and in addition, the vacuum pump does not make much noise and is durable. Further, the shafts 102 and 103 can be rotated at a higher speed and the pump can be compact by supporting the shafts 102 and 103 by the static gas bearing.

The fluid rotary apparatus shown in FIG. 2 may be applied to a positive-displacement vacuum pump. The pump does not require the provision of a mechanical sliding portion which allows the shafts to be rotated synchronously both in the transient state (rise time and fall time) and in the steady state. That is, the pump does not require the supply of lubricating oil. Therefore, the pump is clean and the shafts (rotors) rotate at a high speed, and in addition, the apparatus is durable.

Additionally, the apparatus can include a vacuum setting means 160 for setting the amount of in a discharge space and a vacuum detecting means 161 for detecting the amount of vacuum therein. The frequency of the pulse signal indicating the rotational speed of the shafts 102 and 103 is varied according to the difference between a set amount of vacuum and a detected amount of vacuum. The number of rotations of the rotors 104 and 105 may be varied according to the detected vacuum degree in the discharge space. Thus, the rotational speed of the rotors 104 and 105 can be accurately controlled and consequently, gas can be accurately discharged in a wide vacuum range from a low vacuum to a high vacuum. Therefore, gas discharge performance can be controlled with a high accuracy. For example, the control of the pressure in the vacuum chamber can be facilitated without using a butterfly valve.

The fluid rotary apparatus is capable of discharging gas and controlling pressure with a high accuracy without providing the vacuum pump with a flow rate controlling equipment, for example, a butterfly valve.

Figure 5:
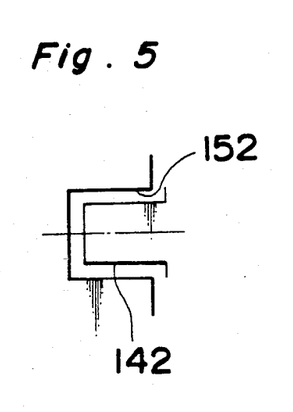
FIG. 5 is explanatory view showing a part of a screw of the positive-displacement vacuum pump of FIG. 2.

As shown in FIG. 5, normally, the phase difference between the rotational angles of the shafts 102 and 103 is adjusted to the predetermined phase difference so that the center line of the convex or concave of the screw 142 and that of the concave or convex of the screw 152 align with each other. But in order to increase gas discharge efficiency in the steady state, it is preferable that the center line of the convex or concave of the screw 142 and that of the concave or convex of the screw 152 do not align with each other (for example, rotational angle difference of the shafts 102 and 103 is set to approximately 0.01°.) At this time, the pulse extracting sections 35 and 45 extract a necessary number of pulses from the pulse signal for rotating the shafts 102 and 103. The pulse extracting sections 35 and 45 are provided both in the motor control circuits 3 and 4 so that the center line of the convex or concave of the screw 142 and that of the concave or convex of the screw 152 do not align with each other in both backward and forward directions. In order to change the rotational angle difference of the shafts 102 and 103 as fine as 0.01°, an encoder having approximately 10,000 light transmitting slits per 360° (one rotation) is preferably used to obtain pulses of 40,000 resolutions, namely, four times as great as 10,000. Thus, 360°/40000=0.01°

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A multi-shaft driving apparatus comprising:
a plurality of motors each for rotating one of a plurality of shafts to be synchronously rotated;
an encoder, providing for each motor, for detecting a rotational state of the shafts;
a pulse generator for generating a pulse signal for rotating the shafts; and
a motor control circuit, provided for each motor, for inputting the pulse signal from the pulse generator and a pulse signal detected by the encoder and used as a feedback signal to control the synchronization of the shafts, the motor control circuit having a PLL controller for performing a PLL control operation and a rotational angle phasing controller for performing a rotational angle phasing operation;
wherein in the motor control circuit:
a rotational angle phasing control loop is generated to perform the rotational angle phasing operation by the rotational angle phasing controller so as to synchronously rotate the shafts at a rise time or a fall time, and
a steady control loop is generated to perform the PLL control operation by the PLL controller at a steady state after the rise time and before the fall time.

2. In a fluid rotary apparatus comprising:
a plurality of rotors accommodated in a housing;
a plurality of shafts each for rotating one of the rotors to be synchronously rotated; and
a fluid drawing opening formed in the housing and a fluid discharge opening formed therein;
wherein the volume change of a space formed by the rotors and the housing is utilized to draw and discharge fluid,
the improvement comprising:
a plurality of motors each for rotating one of a plurality of the shafts to be synchronously rotated;
an encoder, provided for each rotor, for detecting the rotational state of the shafts;
a pulse generator for generating a pulse signal for rotating the shafts; and
a motor control circuit, provided for each motor, for inputting the pulse signals from the pulse generator and a pulse signal detected by the encoder and used as a feedback signal to control the synchronization of the shafts, the motor control circuit having a PLL controller for performing a PLL control operation and a rotational angle phasing controller for performing a rotational angle phasing operation;
and further comprising vacuum setting means for setting an amount of vacuum in a discharge space and vacuum detecting means for detecting the amount of vacuum therein so that the frequency of the pulse signal from the pulse generator for rotating the shafts is varied according to a difference between the set amount of vacuum and the detected amount of vacuum.

3. In a fluid rotary apparatus comprising:
a plurality of rotors accommodated in a housing;
a plurality of shafts each for rotating one of the rotors to be synchronously rotated; and
a fluid drawing opening formed in the housing and a fluid discharge opening formed therein;
wherein the volume change of a space formed by the rotors and the housing is utilized to draw and discharge fluid,
the improvement comprising:
a plurality of motors each for rotating one of a plurality of the shafts to be synchronously rotated;
an encoder, provided for each motor, for detecting the rotational state of the shafts;
a pulse generator for generating a pulse signal for rotating the shafts; and a motor control circuit, provided for each motor, for inputting the pulse signals from the pulse generator and a pulse signal detected by the encoder and used as a feedback signal to control the synchronization of the shafts, the motor control circuit having a PLL controller for performing a PLL control operation and a rotational angle phasing controller for performing a rotational angle phasing operation;

wherein in the motor control circuit;

a rotational angle phasing control loop is generated to perform the rotational angle phasing operation by the rotational angle phasing controller so as to synchronously rotate the shafts at a rise time or a fall time, and a steady control loop is generated to perform the PLL control operation by the PLL controller at a steady state after the rise time and before the fall time.

* * * * *